US011010091B2

(12) United States Patent
Patel et al.

(10) Patent No.: US 11,010,091 B2
(45) Date of Patent: May 18, 2021

(54) MULTI-TIER STORAGE

(71) Applicant: International Business Machines Corporation, Armonk, NY (US)

(72) Inventors: Kushal Patel, Pune (IN); Pardeep Singh, Pune (IN); Sarvesh S. Patel, Pune (IN); Sachin Chandrakant Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/554,892

(22) Filed: Aug. 29, 2019

(65) Prior Publication Data

US 2021/0064272 A1 Mar. 4, 2021

(51) Int. Cl.
*G06F 3/06* (2006.01)
*G06F 12/0811* (2016.01)
*G06F 12/08* (2016.01)

(52) U.S. Cl.
CPC .......... *G06F 3/0655* (2013.01); *G06F 3/068* (2013.01); *G06F 3/0611* (2013.01); *G06F 12/08* (2013.01); *G06F 12/0811* (2013.01)

(58) Field of Classification Search
CPC ...... G06F 3/0655; G06F 3/0611; G06F 3/068; G06F 12/08; G06F 12/0811
See application file for complete search history.

(56) References Cited

U.S. PATENT DOCUMENTS

| 9,275,063 | B1* | 3/2016 | Natanzon | G06F 3/065 |
| 10,216,458 | B2 | 2/2019 | Sabloniere | |
| 10,268,526 | B1 | 4/2019 | Martin | |
| 2008/0021776 | A1* | 1/2008 | Lochtefeld | G06Q 90/00 |
| | | | | 705/14.46 |
| 2014/0208021 | A1* | 7/2014 | Benhase | G06F 12/0806 |
| | | | | 711/113 |
| 2016/0179405 | A1* | 6/2016 | Sabloniere | G06F 3/0653 |
| | | | | 711/114 |
| 2018/0074750 | A1 | 3/2018 | Dudas et al. | |
| 2019/0042106 | A1 | 2/2019 | Klein et al. | |
| 2020/0183857 | A1* | 6/2020 | Nair | G06F 3/0635 |

OTHER PUBLICATIONS

IBM, "IBM Research—Almaden", printed May 20, 2019, 11 pages http://www.almaden.ibm.com/storagesystems/projects/easytier/.
IBM, "Easy Tier function", IBM Knowledge Center, printed May 20, 2019, 3 pages https://www.ibm.com/support/knowledgecenter/STSLR9_8.2.0/com.ibm.fs9100_820.doc/svc_easy_tier.html.

* cited by examiner

*Primary Examiner* — Sean D Rossiter
(74) *Attorney, Agent, or Firm* — Donald J. O'Brien (57) ABSTRACT

Embodiments are disclosed for a multi-tier storage system. The techniques include identifying a candidate extent stored in a first tier of a first storage pool of a multi-tier storage system (MTSS). The candidate extent is blocked from promotion because of a space constraint on a second tier. The techniques also include identifying a second tier of a second storage pool. The second tier provides faster input-output (I/O) access than the first tier provides. Additionally, the second pool includes available space to store the candidate extent. The techniques further include copying the candidate extent to the second tier of the second storage pool. The techniques also include generating a cross-pool mapping. The cross-pool mapping maps from a first address of the candidate extent in the first tier of the first storage pool to a second address of the copied candidate extent in the second tier of the second storage pool.

20 Claims, 10 Drawing Sheets

MULTI-TIER STORAGE

BACKGROUND

The present disclosure relates to multi-tier storage, and more specifically, to a multi-tier storage system.

Storage systems are systems used by computers to perform the reading and writing of data. Data may be read from, and written to, different types of storage devices, e.g., hard disk drives, solid-state drives, flash memory, and the like. Each type of storage device offers different advantages and challenges in terms of access, latency, and other criteria. A multi-tier storage system (MTSS) can include multiple types of storage devices grouped into tiers based on the speed of access. For the purpose of efficiency, an MTSS can store relatively frequently accessed data on a tier with relatively faster access storage devices. Further, the MTSS can store relatively less frequently accessed data on a tier with relatively slower access storage devices.

SUMMARY

Embodiments are disclosed for techniques of a multi-tier storage system. The techniques include identifying a candidate extent stored in a first tier of a first storage pool of a multi-tier storage system (MTSS). The candidate extent is blocked from promotion because of a space constraint on a second tier. The techniques also include identifying a second tier of a second storage pool. The second tier provides faster input-output (I/O) operations than the first tier provides. Additionally, the second pool includes available space to store the candidate extent. The techniques further include copying the candidate extent to the second tier of the second storage pool. The techniques also include generating a cross-pool mapping. The cross-pool mapping maps from a first address of the candidate extent in the first tier of the first storage pool to a second address of the copied candidate extent in the second tier of the second storage pool.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Some storage control systems provide the mechanism of multi-tiered storage where the data is stored across multiple types of storage mediums based on criteria, such as, access, frequency of use, security and data recovery requirements. In terms of security, sensitive data might be stored on relatively high-speed solid state drives (SSD), along with frequently accessed data. In contrast, infrequently accessed data (for which a higher response time can be more tolerable) might be stored in a slower performing tier on high-capacity drives. The cost per gigabyte of storage is relatively higher for faster-performing storage devices, such as SSDs, and relatively lower for the slower performing drives.

More specifically, a multi-tier storage system (MTSS) calculates a heat value for data that takes into consideration the above-stated criteria, for example. The MTSS can thus use predetermined threshold heat values to determine in which tier to store, any particular portion of data. Data portions are referred to herein as extents and grains of extents. Using heat values in this way, the MTSS can store relatively highly accessed data to faster performing tiers when a predetermined threshold is reached for the associated tier. In contrast, the MTSS can move the data extents with lower heat values, i.e., relatively fewer accesses (e.g., where an access includes a read or a write operation), to a slower performing tier when the predetermined threshold is reached for the associated tier.

In an MTSS, there can be at least two tiers available, wherein the first tier can provide relatively fast response times (and relatively less storage capacity) and the other tiers can provide relatively slow response times (and relatively more storage capacity). While the storage devices having faster response times can be more expensive than storage devices having slower response times, the capacity of relatively faster storage devices can be less than that of relatively slower storage devices. Accordingly, an MTSS moves data with relatively high heat values (hot data) to the faster tiers, and data with relatively low heat values (cold data) to slower tiers. This process of moving data to a faster tier is referred to herein as promotion. Conversely, the process of moving data to a slower tier is referred to herein as demotion. The MTSS can perform the extent promotion and demotion processes using a copy operation that is performed without the knowledge of the application that is using the data. In this way, user transparency is maintained. User transparency refers to the location and management of the data being transparent (not viewable) to the application that is using the data (user). In this way, the data movement is also not visible to the user. Since solid state drives (SSDs) are faster than hard disk drives (HDDs), an MTSS can provide dynamic relocation of data across tiers based on the data usage by placing hot data, i.e., data with high IO density and low response time requirements, on SSDs. Conversely, an MTSS can use HDDs for cold, or cooler, data that is accessed at lower rates and/or sequentially.

In addition to storing data within tiers, an MTSS can organize the tiers within pools. Hence, data can be promoted and demoted across tiers within a pool of data. Consider there are two pools in a storage system, i,e., Pool 1 and Pool 2. Each of these pools can include two tiers, e.g., two different types of disks on which the tiering feature is enabled. In this scenario, Pool 1 can be actively used by computer applications for READ/WRITE I/O operations. (This can potentially happen in a storage system wherein volumes from one pool are accessed more than volumes from other pools that are serving some different purpose and can be accessed less frequently). As Pool 1 is accessed more frequently than Pool 2, the heat map of the extents in the Pool 1 contains higher, i.e., hotter, heat values. A heat map can map access counts of I/O operations to each extent in a storage pool. In this scenario, Pool 2's extents are less frequently accessed than Pool 1's extents. In other words, the heat map in Pool 2 can have relatively lower heat values than the heat map of Pool 1. Because Pool 1's extents are more frequently accessed, containing greater heat values, more data extents can meet their threshold heat values for promotion in Pool 1. As the faster tier storage space is costlier, there can be a limited amount of storage capacity in the upper tier of any pool. Accordingly, in Pool 1, the faster tier space can fill even as potentially more data extents in the slower tier space can meet their threshold heat values for promotion. However, because the faster tier is full, such promotion candidates cannot be promoted to the faster tier because of space constraints at the faster tier. Accordingly, promotion of these promotion candidates to the faster tier may be delayed or denied such that I/O operations for these promotion candidates are served with slower tier performance characteristics. However, because Pool 2 is less frequently accessed, the faster tier space of Pool 2 can be underutilized. As such, the MTSS does not take advantage of the faster tier in Pool 2 because there can be fewer extents in Pool 2 experiencing enough heat in I/O operations to meet the threshold for movement to the faster tier.

However, current systems do not support cross pool promotion or demotion. Thus, storage extents are not promoted across the pools (i.e. extents cannot be moved from Pool 1 to Pool 2 directly). As such, the promotion candidates can be stuck in the slower tier in Pool 1 even though they are promotion candidates and there is available space in a faster tier in Pool 2. As such, this scenario can represent an imbalance at the storage system level wherein Pool 1's extents are struggling for promotion while Pool 2's faster tier has available, and unused, space because of the less frequent I/O operations in Pool 2.

Accordingly, in embodiments of the present disclosure, candidate extents that are blocked from promotion in one storage pool can be promoted across storage pools. More specifically, when a data extent becomes eligible for promotion, these candidate extents can be promoted to a faster tier even if there is not enough space available in their own storage pool. Rather, such candidate extents can be promoted to the faster tier of a different storage pool that has space available.

Figure 1:
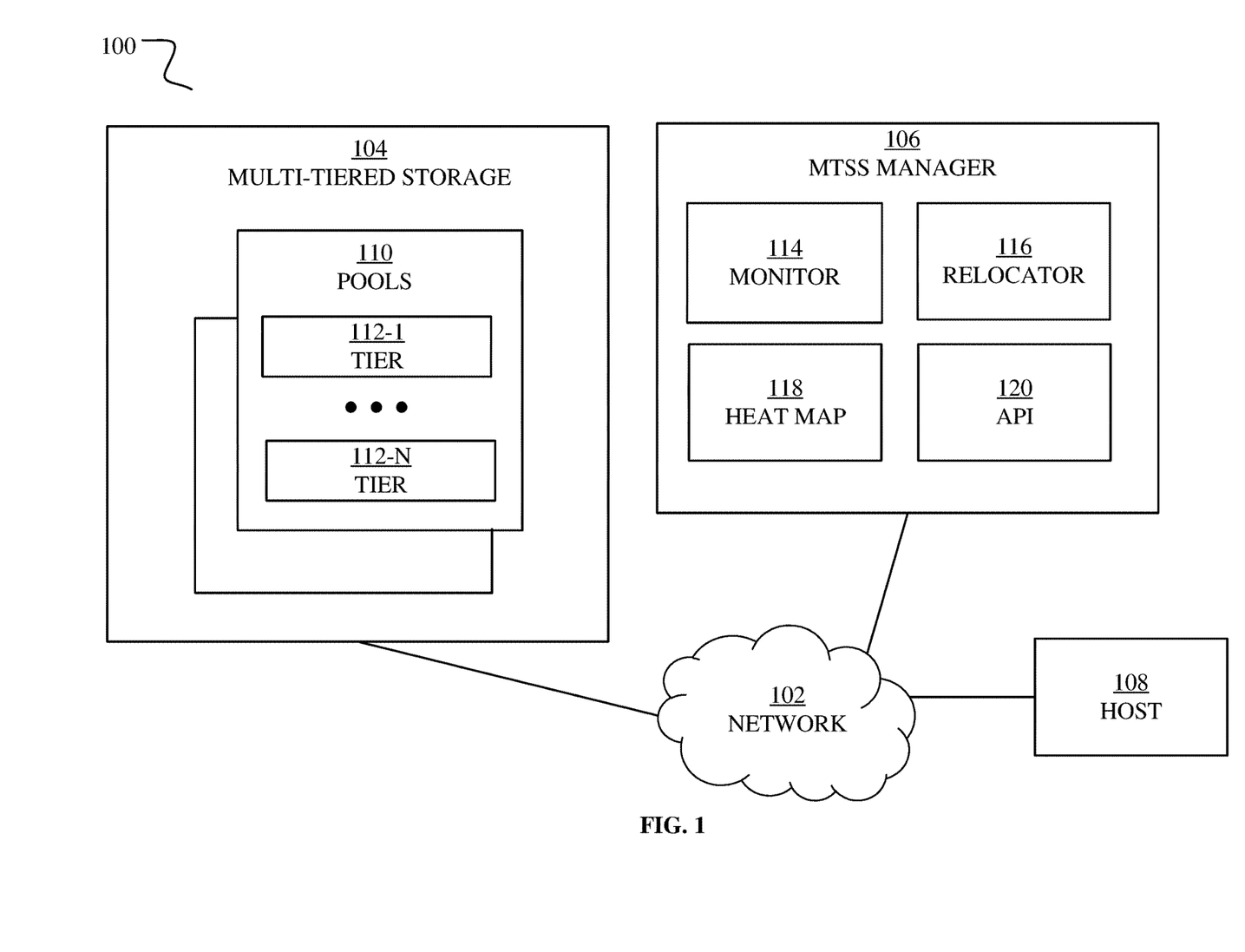
FIG. 1 is a block diagram of a multi-tier storage system (MTSS), in accordance with some embodiments of the present disclosure.

Referring now to FIG. 1, which is a block diagram of a multi-tier storage system (MTSS) 100, in accordance with some embodiments of the present disclosure. The MTSS 100 includes a network 102, multi-tiered storage 104, MTSS manager 106, and a host 108. The network 102 can be one or more computer communication networks, including wired and/or wireless local area networks and/or wide-area networks (WANs). WANs can include the Internet, for example. The multi-tiered storage 104, MTSS manager 106, and host 108 can be in communication over the network 102.

The multi-tiered storage 104 can include the actual data storage devices of the MTSS 100, such as SSDs, HDDs, flash storage, and the like. The multi-tiered storage 104 can be a block level storage system and can organize the data storage devices into pools 110. Organizing storage devices into pools 110 can be useful for efficiency reasons when running relatively large numbers of computer applications. A pool 110 of storage devices can include multiple types, from relatively fast to relatively slower storage devices. According to embodiments of the present disclosure, each of the pools 110 can be organized into multiple tiers 112-1 through 112-n. The tiers 112 are referred to herein individually, e.g., tier 112-1, and collectively, e.g., tiers 112. The tier 112-1 can represent the relatively fastest tier. Conversely, in a storage pool 110 with n tiers 112, the tier 112-n can represent the relatively slowest tier.

The monitor 114 can monitor I/O operations to extents across the storage pools 110 in the multi-tiered storage 104 to generate a heat map 118 for each of the data extents. The host 108 can be a computer application that is using the multi-tiered storage 104 for the computer application's data. In this way, the MTSS manager 106 can identify candidate extents for promotion that can be blocked from promotion in their own storage pools 110. Further, the MTSS manager 106 can identify a faster tier in a different storage pool that has space available and promote the blocked candidate extent to the faster tier in the different storage pool. The MTSS manager 106 includes a monitor 114, a relocator 116, a heat map 118, and an application programming interface (API) 120.

The monitor 114 can monitor the I/O operations performed for each data extent in the storage pools 110. The monitor 114 can be a heat monitoring daemon that updates the extent heat for each I/O operation executed on the storage pool 110. This heat information is further utilized to determine the extent promotion and demotion across the tiers 112 of the pool 110.

The relocator 116 can identify data extents that are relatively frequently accessed (hot) based on the access heat temperature (access counters which are updated on each I/O operation). Accordingly, the relocator 116 promotes the hot data extents to SSDs for high throughput, low latency, and/or I/O operations per second (IOPS) energy-efficient characteristics.

More specifically, the monitor 114 can generate the heat map 118 of the extents stored in the multi-tiered storage 104 across the storage pools 110. Further, the relocator 116 can periodically evaluate the heat map 118 of each storage pool 110 and identify candidate extents for promotion and demotion. Accordingly, the relocator 116 can move candidate extents across tiers 112 when the candidate extents meet their promotion or demotion thresholds. These periodic evaluation and promotion/demotion techniques are referred to herein as promotion cycles.

According to embodiments of the present disclosure, the MTSS manager 106 can detect an I/O operation imbalance across storage pools 110 of available space in faster performing tiers 112. Further, the MTSS manager 106 can identify the extent promotion candidates in each pool 110 that have met the heat threshold for promotion but are still waiting for promotion because of space constraints in the promotional tier.

More specifically, the relocator 116 can identify candidate extents in slower tiers that have met the promotion threshold but cannot be promoted. Further, the relocator 116 can determine where there is available space in a faster tier 112 in another storage pool 110 for the candidate extent and copy the candidate extent to the faster tier 112 in the other storage pool 110. In this way, the original copy of the extent can be kept intact as the MTSS manager 106 may not move the extent across pools. Hence, the MTSS manager 106 copies extents to faster performing tiers of neighboring pools. Additionally, the MTSS manager 106 can maintain a mapping from the address in the original tier to the address in the new faster tier. Further, the MTSS manager 106 can update the heat map 118 for the copied extents. For example, HEAT MAP EXAMPLE 1 shows a heat map 118 before extents number 4 and 5 are copied to a peer pool:

| HEAT MAP EXAMPLE 1 | | | | | | | | | |
|---|---|---|---|---|---|---|---|---|---|
| E1 | E2 | E3 | E4 | E5 | E6 | E7 | E8 | E4_copy | E5_Copy |
| 101 | 100 | 103 | 104 | 123 | 132 | 73 | 12 | NA | NA |

In this example, the first row represents the extent, E1 through E8, with entries for the E4 and E5 copies. The second row represents the access counts for I/O operations of each extent. As shown, the access counts for E4 and E5 are 104 and 123, respectively. The E4 and E5 copies show NA because there are not any accesses before the copies take place.

In contrast, HEAT MAP EXAMPLE 2 shows the heat map 118 updated after copying extents 4 and 5, (E4, E5):

| HEAT MAP EXAMPLE 2 | | | | | | | | | |
|---|---|---|---|---|---|---|---|---|---|
| E1 | E2 | E3 | E4 | E5 | E6 | E7 | E8 | E4_copy | E5_Copy |
| 101 | 100 | 103 | 23 | 30 | 132 | 73 | 12 | 134 | 122 |

In this example, the heat values of E4 and E5 are 23 and 30, respectively, indicating the few accesses to the original copies of E4 and E5 during a promotion cycle after the extents are copied. Further, the heat values for the copies of E4 and E5 are 134 and 122, indicating the higher number of accesses performed to take advantage of the faster response speed of the upper tier in the peer pool.

However, creating a copy of the extent can be complicated by any WRITE operations for the copied extent. More specifically, if one of the copies is overwritten by a WRITE operation, the other copy is no longer valid for READ operations. While the MTSS manager 106 can update the other copy by repeating the WRITE operation on the other copy, this additional WRITE can be an expensive I/O operation and thus can increase latency. Accordingly, candidate extents can be categorized based on the access counts, and the type of I/O operations performed for the candidate extents. Accordingly, candidate extents can be promoted (copied to other storage pools 110) based on the percentage of operations that are READ versus WRITE. For example, the relocator 116 can categorize the candidate extents as READ_ONLY, READ_INTENSIVE, MIXED_WORKLOAD, and WRITE_MAJOR based on their read/write workload. The READ_ONLY category can include candidate extents with READ operations but no WRITE operations in the current promotion cycle. The READ_INTENSIVE category can include candidate extents with a predetermined threshold of READ operations over WRITE operations in the current promotion cycle. For example, the READ_INTENSIVE category can include candidate extents where READ operations represent 80% or more of the I/O operations. The MIXED_WORKLOAD category can include candidate extents where READ operations represent between 50% and 80% of the I/O operations. The WRITE_MAJOR category can include candidate extents where WRITE operations represent more than 50% of the I/O operations.

Thus, the priority of the candidate extents for promotion across storage pools 110 can be based on the category. For example, READ_ONLY extents can be assigned priority over the remaining categories. In this way, additional WRITE operations to maintain data integrity for both copies can be avoided. However, in some embodiments, candidate extents in other categories can be copied to other storage pools 110, with a descending priority of READ_MAJOR, MIXED_WORKLOAD, and WRITE_MAJOR categories. Priority adjustments can be performed to accommodate I/O processing-intensive operations, such as replicating WRITE operation to maintain valid copies in both the faster tier and the slower tier.

The API 120 can provide access for the host 108 to the data extents in the pools 110 of the multi-tiered storage 104. In other words, when the host 108 performs a READ or WRITE access on a data extent, the host 108 can invoke the API 120 to identify the location of the data extent. If the data extent has been promoted across storage pools 110, the API 120 can identify the appropriate location of the data extent. In this way, the host 108 can READ from, or WRITE to, data extents without knowing on what storage pool 110 or tier 112 the data extent is stored.

Figure 2A:
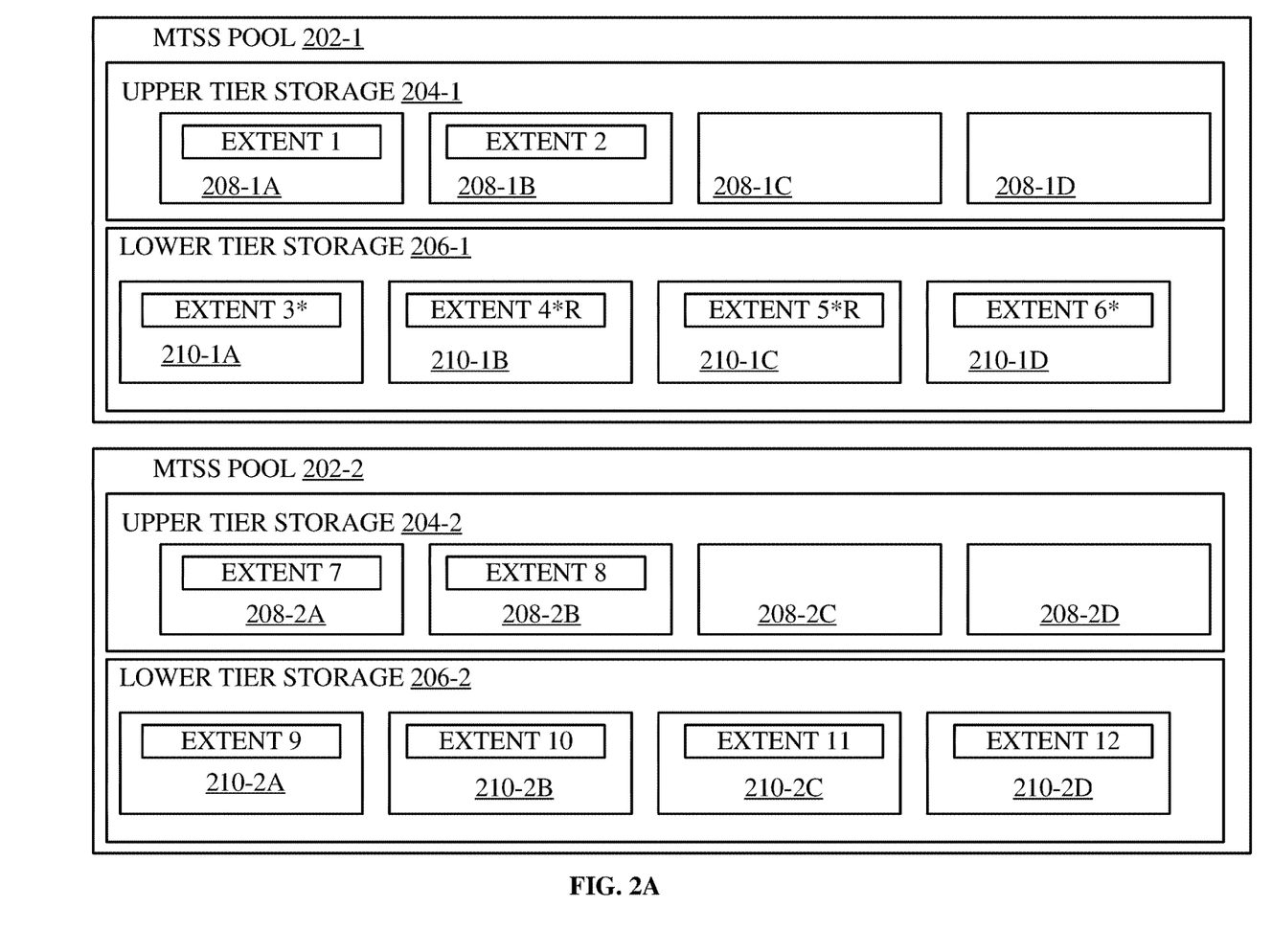
FIG. 2A is a block diagram of MTSS pools of a multi-tier storage before copying, in accordance with some embodiments of the present disclosure.

Referring now to FIG. 2A, which is a block diagram of MTSS pools 202-1, 202-2 of a multi-tier storage before copying, in accordance with some embodiments of the present disclosure. The MTSS pool 202-1 includes an upper tier storage 204-1 and a lower tier storage 206-1. The upper tier storage 204-1 can represent the tier with relatively faster access than the lower tier storage 206-1. The upper tier storage 204-1 includes four slots 208-1A through 208-1D to store promoted extents. For example, slots 208-1A, 208-1B store EXTENT 1 and EXTENT 2, respectively. Similarly, the lower tier storage 206-1 includes four slots 210-1A through 210-1D to store extents. For example, slots 210-1A through 210-1D store EXTENT 3 through EXTENT 6, respectively. In this example, the EXTENTS 3 through 6 are annotated with an asterisk, "*." The asterisk indicates that these extents have met the heat map threshold for promotion to the upper tier storage 204-1. Further, EXTENT 4 and EXTENT 5 also include the annotation, "R." The R annotation indicates that these EXTENTS are READ_ONLY extents.

Additionally, the MTSS pool 202-2 includes an upper tier storage 204-2 and a lower tier storage 206-2. The upper tier storage 204-2 includes four slots 208-2A through 208-2D to store promoted extents. For example, slots 208-2A, 208-2B store EXTENT 7 and EXTENT 8, respectively. Similarly, the lower tier storage 206-2 includes four slots 210-2A through 210-2D to store extents. For example, slots 210-2A through 210-2D store EXTENT 9 through EXTENT 12, respectively. In contrast to the lower tier storage 206-1, none of the extents in slots 210-2A through 210-2D are eligible for promotion.

While there are four candidate extents for promotion from lower tier storage 206-1, there are only two available slots in the upper tier storage 204-1. As such, there is not enough available space in the upper tier storage 204-1 to promote the four candidate extents to the upper tier storage 204-1. However, in MTSS pool 202-2, the upper tier storage 204-2 includes two available slots 208-2C, 208-2D for promotion.

Figure 2B:
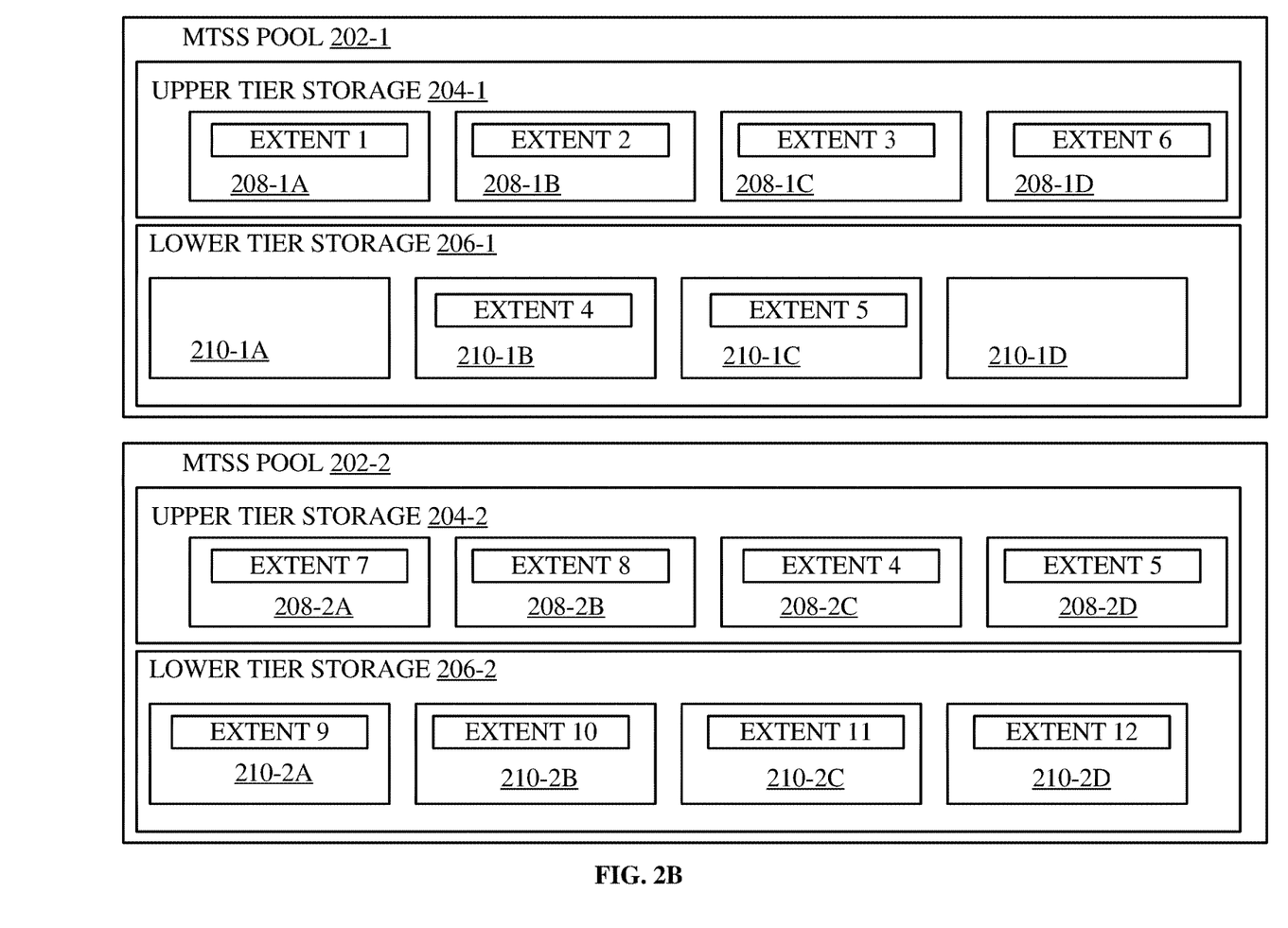
FIG. 2B is a block diagram of MTSS pools of a multi-tier storage after copying, in accordance with some embodiments of the present disclosure.

Referring now to FIG. 2B, which is a block diagram of MTSS pools 202-1, 202-2 of a multi-tier storage after copying, in accordance with some embodiments of the present disclosure. According to embodiments of the present disclosure, an MTSS manager, such as the MTSS manager 106 can promote EXTENT 3 and EXTENT 6 to slots 208-1C, 208-1D, respectively. Thus, the slots 208-1C, 208-1D can store EXTENT 3 and EXTENT 6, respectively.

Further, according to embodiments of the present disclosure, the MTSS manager 106 can copy the READ_ONLY candidate extents, EXTENT 4 and EXTENT 5, to the slots 208-2C, 208-2D, respectively. When using the upper tier storage outside of the home storage pool to store a candidate extent, the MTSS manager 106 can maintain the original copy of the candidate extents in the home storage pool. For example, the slots 210-1B, 210-1C in lower tier storage 206-1 can continue to store EXTENT 4 and EXTENT 5, respectively. The home storage pool can refer to the original physical location of the candidate extent before copying to the peer storage pool.

Figure 3A:
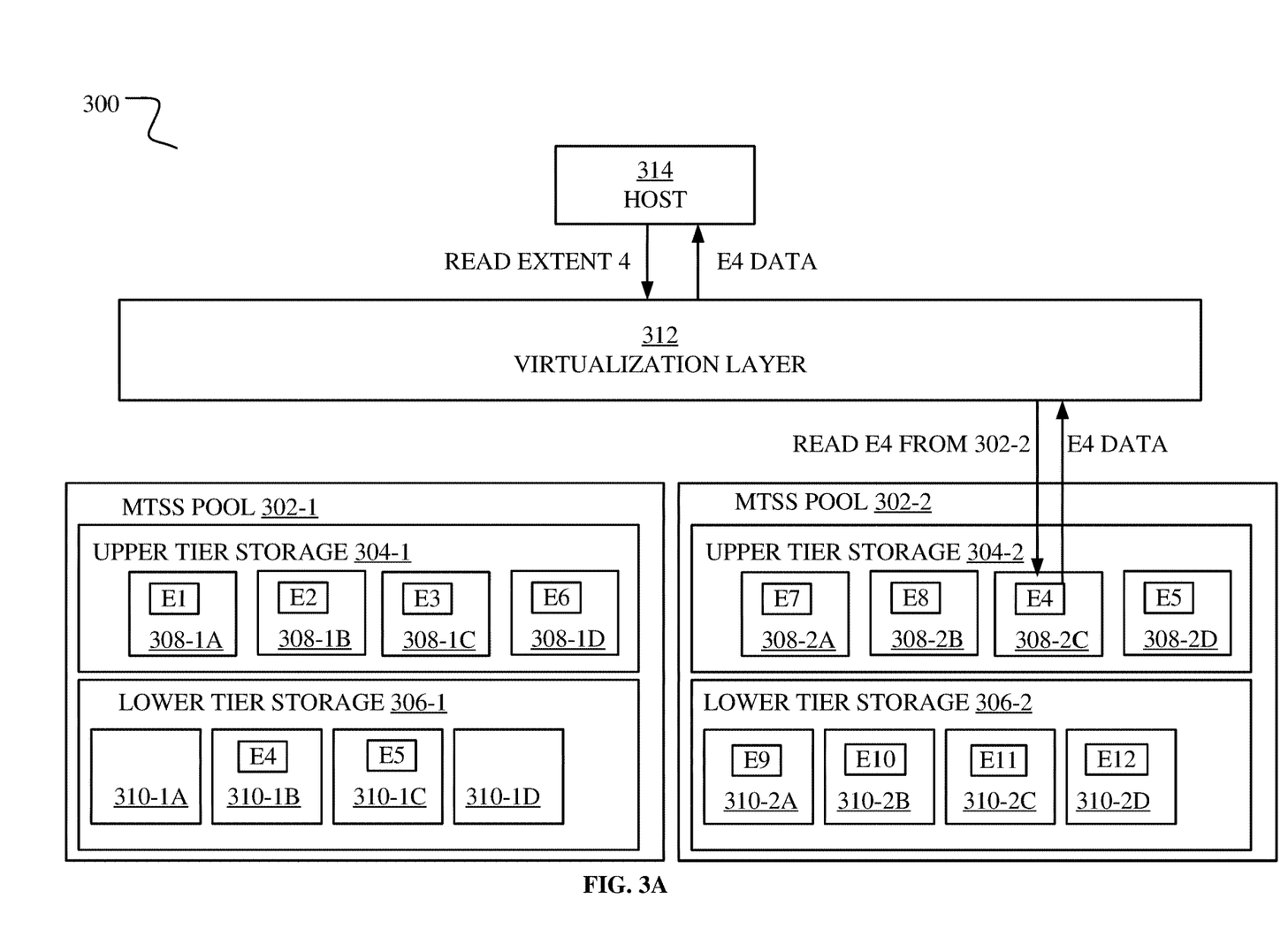
FIG. 3A is a block diagram representing an example of a READ operation from a system for multi-tier storage, in accordance with some embodiments of the present disclosure.

Referring now to FIG. 3A, which is a block diagram representing an example of a READ operation from a system 300 for multi-tier storage, in accordance with some embodiments of the present disclosure. The system 300 includes MTSS pool 302-1, MTSS pool 302-2, a virtualization layer 312, and a host 314. The MTSS pools 302-1, 302-2 can represent the MTSS pools 202-1, 202-2, described with respect to FIG. 2B. Similar to FIG. 2B, the MTSS pools 302-1, 302-2 include upper tier storage 304-1, 304-2, respectively. Also similar to FIG. 2B, the upper tier storage 304-1, 304-2 and lower tier storage 306-1, 306-2 include slots 308-1A through 308-1D, 308-2A through 308-2D and slots 310-1A through 310-1D, 310-2A through 310-2D. However, referring back to FIG. 3A, EXTENTS 1 through 12 are represented as E1 through E12, respectively.

Additionally, the host 314 can represent a computer application that may perform various techniques according to coded computer instructions of the host 314. In order to perform these techniques, the host 314 can manipulate and/or calculate various items of data. Additionally, the host 314 can read and store this data from/in the MTSS pools 302-1, 302-2. However, the access of the data is transparent to the host 314, meaning that the host 314 does not know specifically where its data is stored in the MTSS pools 302-1, 302-2. Rather, the host 314 may maintain an internal directory of memory references, and pass the associated memory reference to the virtualization layer along with requests to READ from, or WRITE to, the memory reference. The memory reference can represent an extent, or a grain of an extent.

The virtualization layer 312 may represent one or more computer applications of an operating system. Through these computer applications, the virtualization layer 312 can translate the address of the requested memory reference from the host 314 to the actual physical address in the MTSS pools 302-1, 302-2. For example, the virtualization layer 312 can use an API, such as the API 120 described with respect to FIG. 1, to determine the specific grains and extents in the MTSS pools 302-1, 302-2 that store the memory reference in the request from the host 314.

Accordingly, the down arrow from the host 314 to the virtualization layer 312 can represent a request from the host 314 to the virtualization layer 312 to read data from extent 4. Accordingly, the virtualization layer 312 can determine that EXTENT 4 is copied to MTSS pool 302-2, providing faster access than to the copy in the lower tier storage 306-1. The arrow from the virtualization layer 312 to EXTENT 4 (E4) represents the request to READ the E4 data from slot 308-2C. Further, the arrow from E4 to the virtualization layer 312 can represent the response to the request, i.e., the E4 data. Similarly, the arrow from the virtualization layer 312 to the host 314 can represent the response to the original request from the host 314 having the E4 data.

As stated previously, the monitor 114 keeps track of I/O operations to all extents in the multi-tier storage 104 to generate the heat map 118. However, because there can be two copies of extents across MTSS pools 302-1, 302-2 as described above, the monitor 114 can treat each READ of the extent from the upper tier storage 304-2 as two READS. Accordingly, for extents that the MTSS manager 106 copies across MTSS pools 302-1, 302-2, the relocator 116 can divide the heat value of copied extents by a redundancy factor (e.g., two) before determining whether the extent has again met the threshold for promotion in the next promotion cycle. If space becomes available in the home storage pool's upper tier, e.g., upper tier storage 304-1, and the copied extent E4 meets the threshold for promotion again, E4 can be moved to upper tier storage 304-1. Moving E4 accordingly can mean deleting E4 from the upper tier storage 304-2. Additionally, moving E4 can mean updating the cross-pool mapping to remove E4. In this way, new space becomes available in the upper tier storage 304-2 that can be used for other promotion candidates in MTSS pool 302-1 that may get delayed for promotion by space constraints.

Further, even though the MTSS manager 106 can categorize a candidate extent as READ_ONLY, and thus copy the candidate extent across pools, the host 314 can later WRITE to that extent. However, because there are two copies of the extent, one in each of the MTSS pools 302-1, 302-2, overwriting the data in one copy can invalidate the data in the other copy. Invalidating means that the data in that copy is no longer current, i.e., valid. Thus, reading the invalidated copy provides the wrong data. Accordingly, in some embodiments of the present disclosure, the MTSS manager 106 can replicate WRITE operations when extents are copied across pools. Alternatively, the MTSS manager 106 can overwrite the copy in the home storage pool, e.g., MTSS pool 302-1, and use an invalidation technique to prevent future reads of the invalidated copy.

Figure 3B:
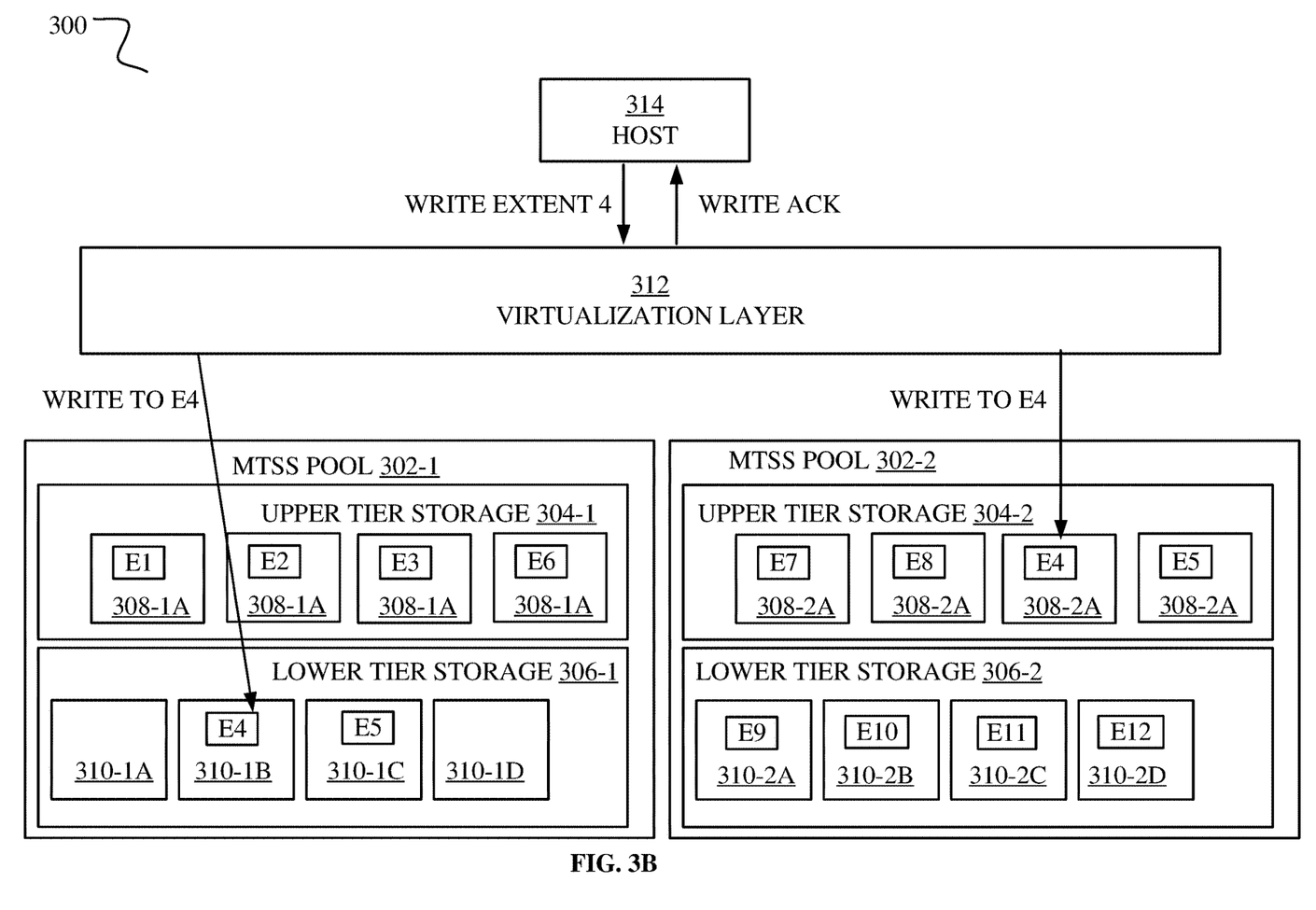
FIG. 3B is a block diagram representing an example of a WRITE operation with replication in a system for multi-tier storage, in accordance with some embodiments of the present disclosure.

Referring now to FIG. 3B, which is a block diagram representing an example of a WRITE operation with replication in a system 300 for multi-tier storage, in accordance with some embodiments of the present disclosure. The arrow from the host 314 to the virtualization layer 312 can represent a request to WRITE a value to a specific grain of E4. Accordingly, virtualization layer 312 can issue requests for two WRITE operations. The two arrows from the virtualization layer 312 to E4 in slots 310-1B, 308-2A can represent these WRITE requests. Additionally, when the WRITE operations are complete, the virtualization layer 312 can notify the host 314. Specifically, the arrow from the virtualization layer 312 to the host 314 can represent an acknowledgement (ACK) that the WRITE operation completed successfully.

Replicating the WRITEs to the copies of the extents in both MTSS pools 302-1, 302-2 keeps both copies synchronized. In this way, the MTSS manager 106 can preserve atomicity consistency isolation durability (ACID) properties of the copied extents. This technique can be useful for extents that are categorized READ_ONLY or READ_INTENSIVE because the additional latency of the replicated write can be relatively infrequent in comparison to the number of READ operations that can occur for such extents. Thus, the savings of performing READs from the upper tier storage 304-2, as opposed to the lower tier storage 306-1, can compensate for the additional latency of the replicated WRITE operation, and still provide an I/O operations cost savings. However, similar to the READ operations performed on copied extents, the replicated WRITEs mean that two writes are counted in the heat map in the next promotion cycle, which gives the copied extent an unfair advantage in the next promotion cycle. Thus, similar to the techniques for READs, when the MTSS manager 106 replicates WRITEs on copied extents, the relocator 116 can divide the number of WRITEs by two when considering the heat value of copied extents in the next promotion cycle.

Figure 3C:
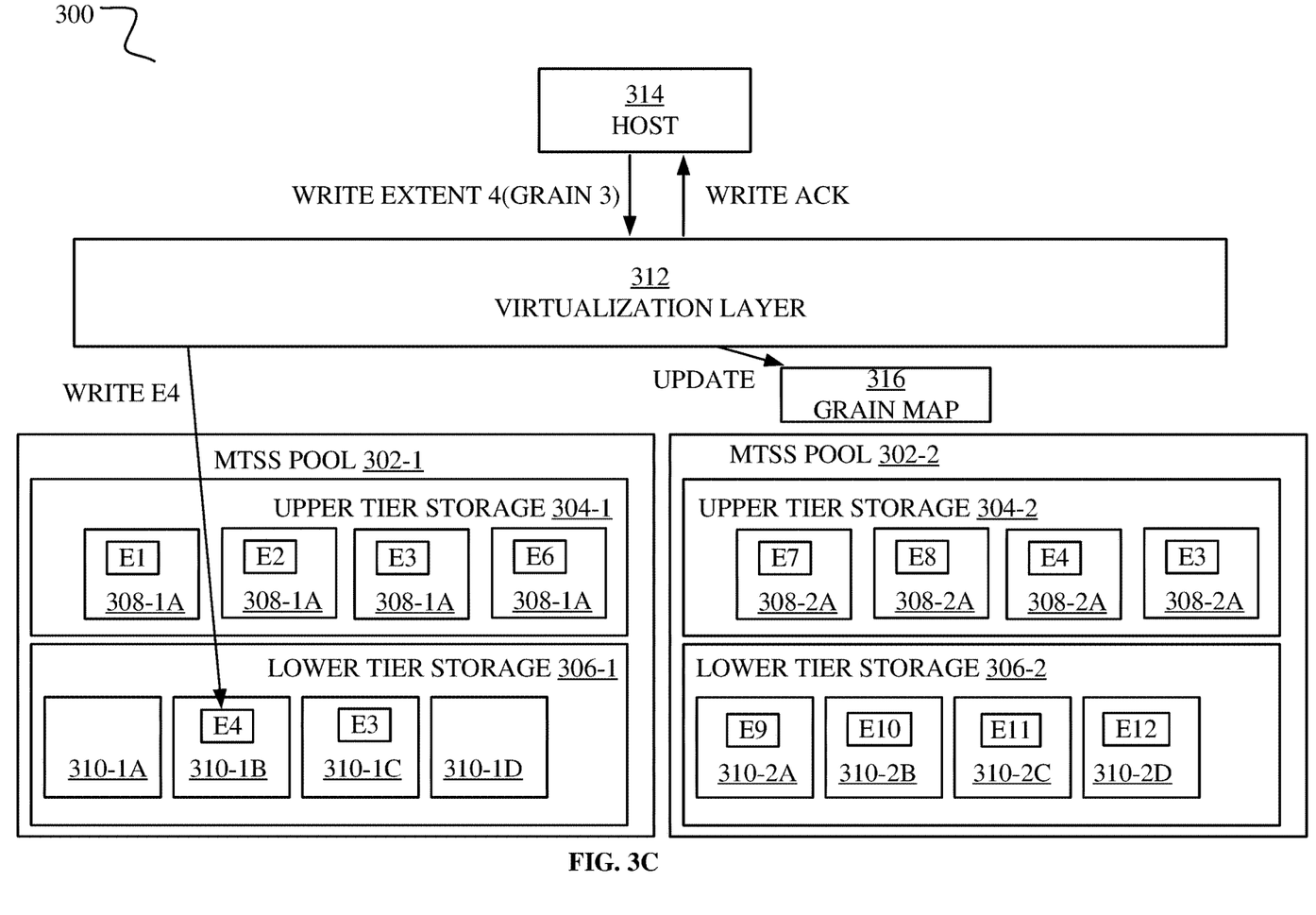
FIG. 3C is a block diagram representing an example of a WRITE operation with invalidation in a system for multi-tier storage, in accordance with some embodiments of the present disclosure.

Referring now to FIG. 3C, which is a block diagram representing an example of a WRITE operation with invalidation in a system 300 for multi-tier storage, in accordance with some embodiments of the present disclosure. According to embodiments of the present disclosure, when the MTSS manager 106 copies E4 to the MTSS pool 302-2, the MTSS manager 106 can also generate a grain map 316. The grain map 316 can be a bitmap, wherein each bit represents one grain of the copied extent. Each bit can indicate whether the associated grain is still a valid copy, meaning the original copy in MTSS pool 302-1 has not been written to since the extent copy. Accordingly, the grain map 316 can initially be set to 1, indicating that yes, the grain is valid. In alternative embodiments, the grain map 316 can be any sort of array capable of representing the validity of each grain in a copied extent, such as an array of single character text values, e.g., "Y," or, "N." EXAMPLE GRAIN MAP STATE 1 represents one potential representation of the grain map 316 for E4 when first copied to MTSS pool 302-2:

| EXAMPLE GRAIN MAP STATE 1 |
| --- | --- | --- | --- | --- | --- | --- | --- |
| GRAIN 1 | GRAIN 2 | GRAIN 3 | GRAIN 4 | GRAIN 5 | GRAIN 6 | GRAIN 7 | GRAIN 8 |
| Y | Y | Y | Y | Y | Y | Y | Y |

Accordingly, when the host 314 requests a READ for a grain of the extent, the virtualization layer 312 can use the grain map 316 to determine whether the copy in the MTSS pool 302-2 is still valid before attempting the READ. However, when a WRITE operation is performed on the copied extent, the MTSS manager 106 can update the grain map 316 to indicate that the grain that is written to is no longer valid.

For example, the arrow from the host 314 to the virtualization layer 312 can represent a request to write to grain 3 of E4. Accordingly, the arrow from the virtualization layer 312 to E4 in the slot 310-1B in lower tier storage 306-1, can represent the WRITE operation performed on grain 3 of E4. However, because grain 3 of E4 has been updated in MTSS pool 302-1, the copy in pool 302-2 is no longer valid. Accordingly, the arrow from the virtualization layer 312 to the grain map 316 can represent an update to the grain map 316 that invalidates grain 3. EXAMPLE GRAIN MAP STATE 2 represents the grain map 316 after this update:

| EXAMPLE GRAIN MAP STATE 2 |
| --- | --- | --- | --- | --- | --- | --- | --- |
| GRAIN 1 | GRAIN 2 | GRAIN 3 | GRAIN 4 | GRAIN 5 | GRAIN 6 | GRAIN 7 | GRAIN 8 |
| Y | Y | N | Y | Y | Y | Y | Y |

As shown, grain 3 is invalidated. Thus, future reads of grain 3 are performed from the original copy in MTSS pool 302-1. Additionally, the arrow from the virtualization layer 312 to the host represents the WRITE ACK response to the original request to WRITE to grain 3 of E4.

This invalidation technique can be useful for extents that are categorized as MIXED_WORKLOAD because multiple READ and WRITE operations can be performed on the extents. Thus, the replication technique could result in numerous increases in latency. Advantageously, by only performing a single WRITE to the original copy for this invalidation technique, there is no latency added due to replicated WRITEs for the copy of the extent in the MTSS pool 302-2.

Figure 4:
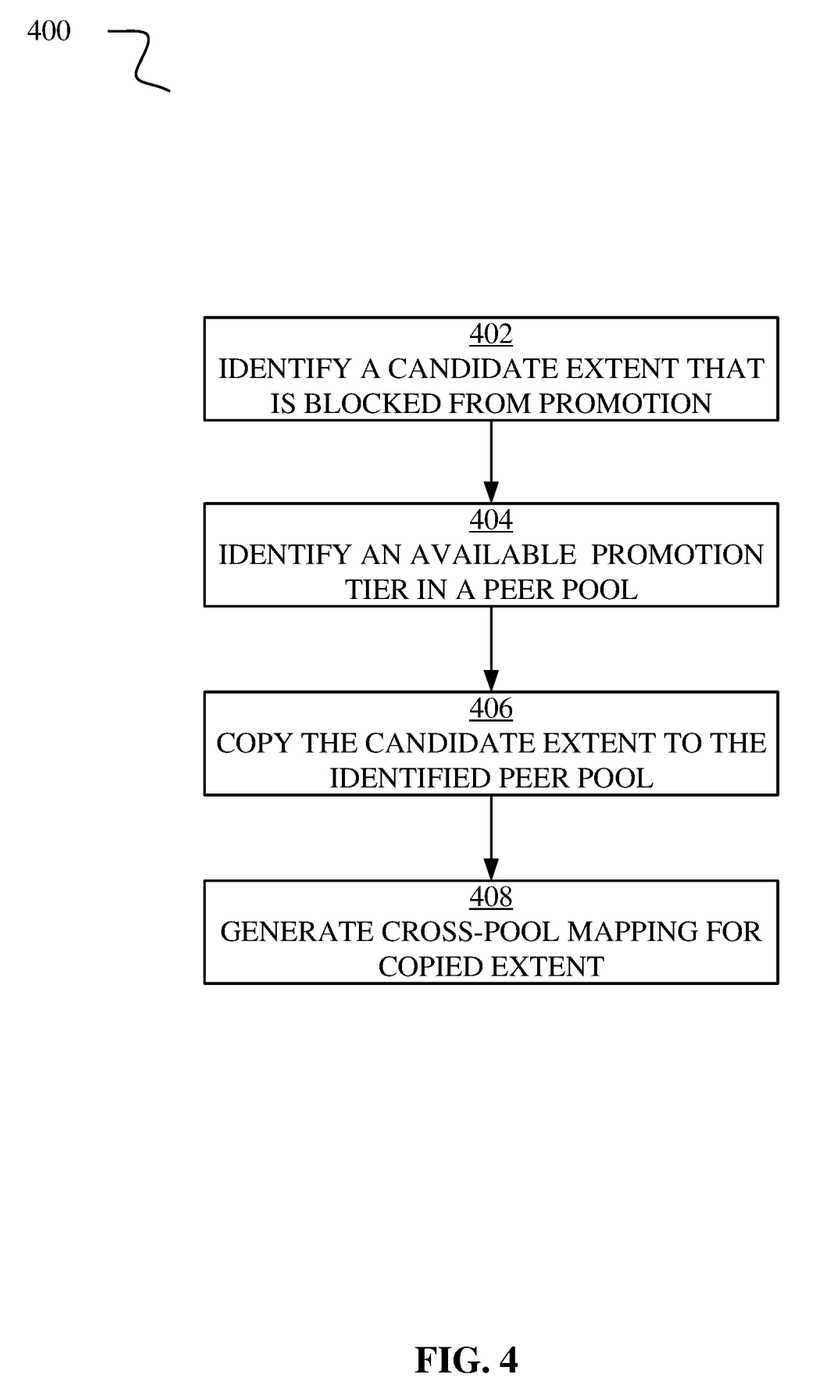
FIG. 4 is a flowchart of an example method for an MTSS, in accordance with some embodiments of the present disclosure.

FIG. 4 is a flowchart of an example method 400 for a multi-tier storage system, in accordance with some embodiments of the present disclosure. The MTSS manager 106 can perform the method 400 in accordance with some embodiments of the present disclosure. At block 402, the MTSS manager 106 can identify a candidate extent that is blocked from promotion. Using the heat map 118, the MTSS manager 106 can identify the candidate extents within each of the storage pools 110 that have met the threshold to be promoted to a faster tier. Further, the MTSS manager 106 can determine whether there is enough space available in the faster tier for the candidate extent's home storage pool to promote the candidate extent. The MTSS manager 106 thus identifies candidate extents with available space lacking in the faster tier as blocked from promotion.

At block 404, the MTSS manager 106 can identify an available promotion tier in a peer storage pool of the blocked candidate extent. According to embodiments of the present disclosure, the MTSS manager 106 can analyze the tiers in peer storage pools that provide faster I/O operations than the current tier of the blocked candidate extent. In this way, the MTSS manager 106 can identify potential destinations for copying the blocked candidate extent.

At block 406, the MTSS manager 106 can copy the candidate extent to the identified peer pool. Accordingly, the original copy of the candidate extent is still stored in the home storage pool. Additionally, a copy of the candidate extent is stored in a faster tier in a peer storage pool. To take advantage of the faster tier in the peer pool, READs of the candidate extent are performed on this additional copy.

At block 408, the MTSS manager 106 can generate a cross-pool mapping for the copied extent. The cross-pool mapping can map the physical address of the original candidate extent to the physical address in the peer pool that stores the copy. This cross-pool mapping is useful when a host requests an I/O operation for the extent.

Figure 5:
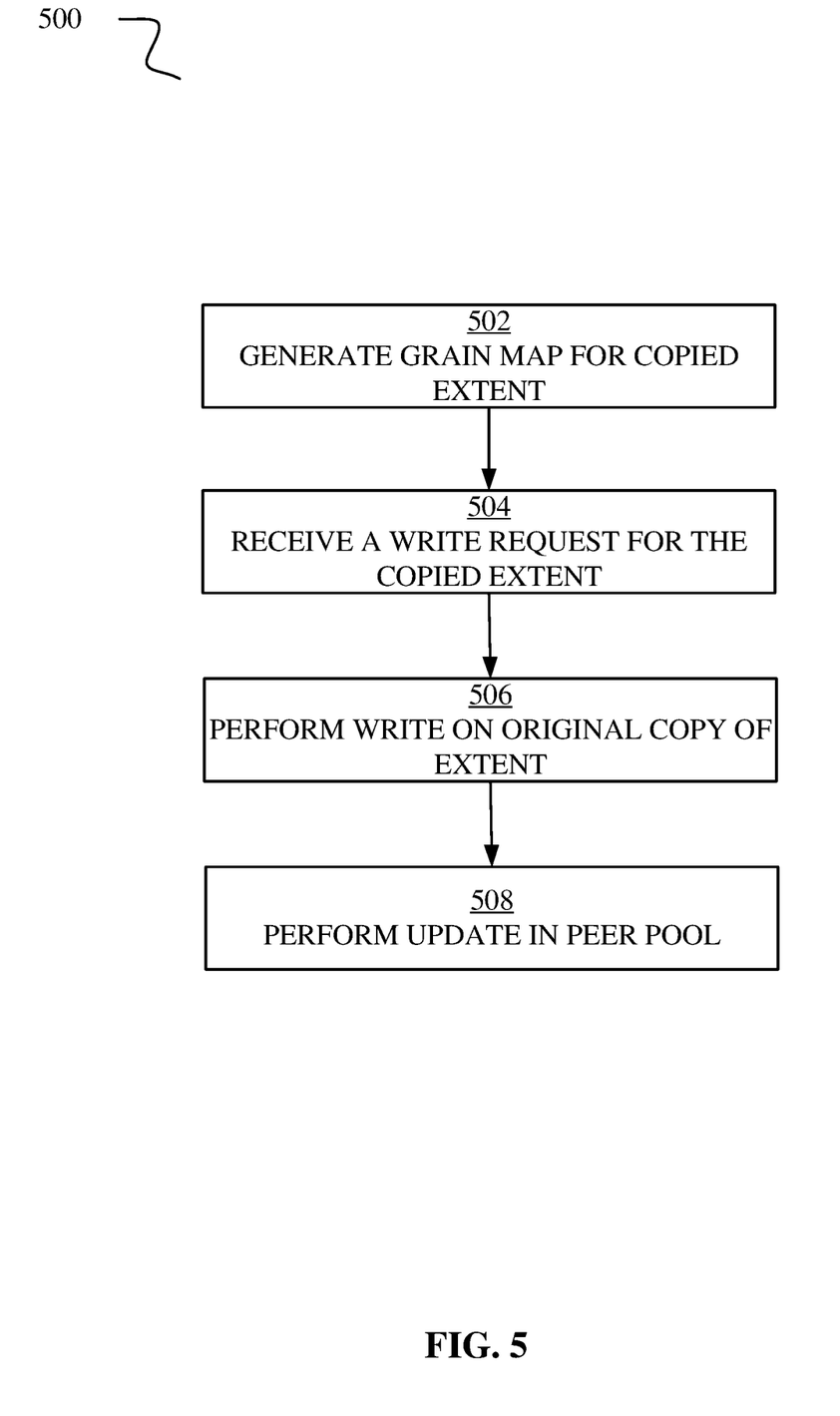
FIG. 5 is a flowchart of an example method for an MTSS, in accordance with some embodiments of the present disclosure.

FIG. 5 is a flowchart of an example method 500 for a multi-tier storage system, in accordance with some embodiments of the present disclosure. The MTSS manager 106 can perform the method 500 in accordance with some embodiments of the present disclosure. At block 502, the MTSS manager 106 can generate a grain map, such as the grain map 316, for a copied extent. As stated previously, the MTSS manager 106 can handle WRITE operations using different techniques: a replicated copy and an invalidation technique. When initially copied to the peer pool, the generated grain map 316 can indicate a valid state for each grain of the copied extent. For the replicated copy approach, the MTSS manager 106 does not generate the grain map 316.

At block 504, the MTSS manager 106 can receive a WRITE request for the copied extent. The host 314 can generate the WRITE request.

At block 506, the MTSS manager 106 can perform the WRITE operation on the original copy of the extent in the home storage pool. The MTSS manager 106 can perform block 506 regardless of whether the replicated copy or the invalidation techniques are used for WRITEs.

At block 508, the MTSS manager 106 can perform an update in the peer pool. For the replicated copy technique, the MTSS manager 106 can replicate the WRITE in the peer pool. Alternatively, for the invalidation technique, the MTSS manager 106 can update the grain map 316 for each grain written to in the home storage pool. In other words, any grains written to in the home storage pool are invalidated in the grain map 316 for the peer pool. Thus, future READs of the overwritten grains are performed in the home storage pool.

Figure 6:
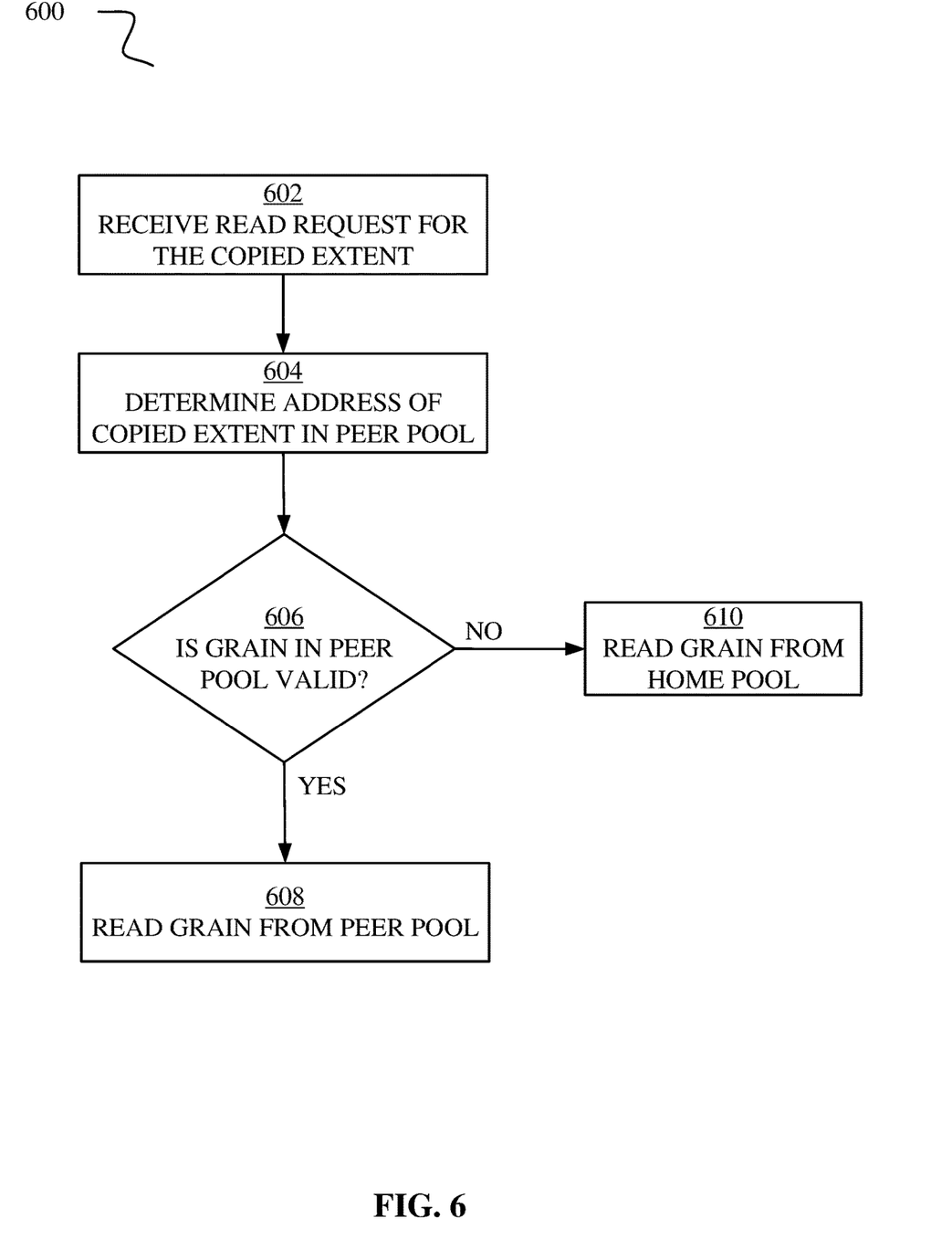
FIG. 6 is a flowchart of an example method for an MTSS, in accordance with some embodiments of the present disclosure.

FIG. 6 is a flowchart of an example method 600 for a multi-tier storage system, in accordance with some embodiments of the present disclosure. The MTSS manager 106 can perform the method 600 in accordance with some embodiments of the present disclosure. At block 602, the MTSS manager 106 can receive a READ request for a copied extent. The host 314 can provide the READ request.

At block 604, the MTSS manager 106 can determine the physical address of the copied extent in the peer storage pool. The MTSS manager 106 can use the cross-pool mapping to determine this address.

At block 606, the MTSS manager 106 can determine whether the grain(s) in the peer storage pool are valid. If the grain(s) in the peer storage pool are valid, control flows to block 608. At block 608, the MTSS manager 106 can read the grain(s) from the faster tier in the peer storage pool.

If the grain(s) in the peer storage pool are not valid, control flows to block 610. At block 610, the MTSS manager 106 can read the grain(s) from the home storage pool.

Advantageously, embodiments of the present disclosure can be implemented without adding new hardware and thus can be relatively easily implemented in current storage systems. Additionally, embodiments can include implementation of in-bound and out-of-bound APIs for inter-pool information inquiry for tier limits and storage space statistics.

Figure 7:
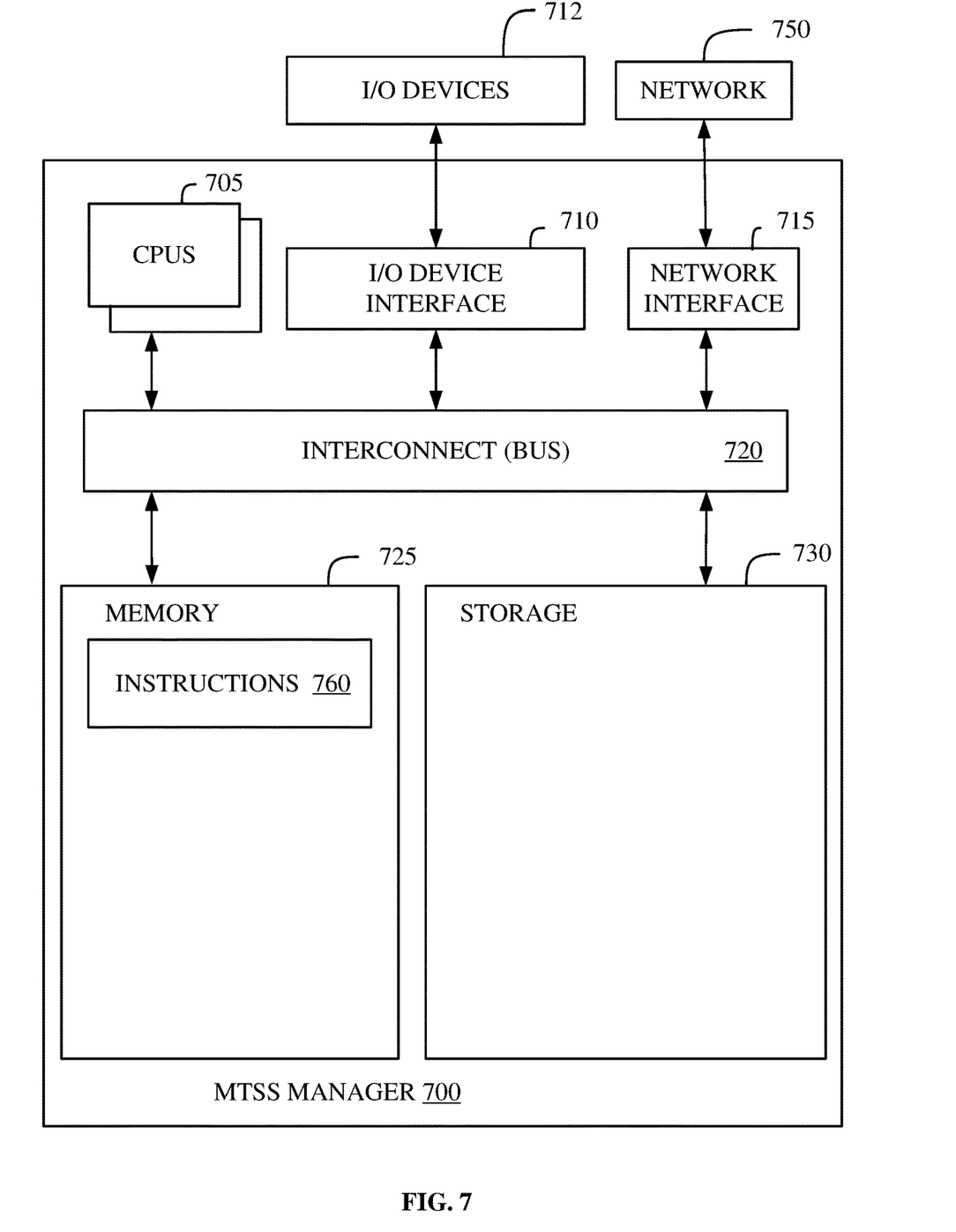
FIG. 7 is a block diagram of an example MTSS manager, in accordance with some embodiments of the present disclosure.

Referring now to FIG. 7, illustrated is a block diagram of an example MTSS manager 700, in accordance with some embodiments of the present disclosure. In various embodiments, the MTSS manager 700 is similar to the MTSS manager 106 and can perform the methods described in FIGS. 4-6 and/or the functionality discussed in FIGS. 1-3. In some embodiments, the MTSS manager 700 provides instructions for the aforementioned methods and/or functionalities to a client machine such that the client machine executes the method, or a portion of the method, based on the instructions provided by the MTSS manager 700. In some embodiments, the MTSS manager 700 comprises software executing on hardware incorporated into a plurality of devices.

The MTSS manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the MTSS manager 700 via the I/O device interface 710 or a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all, any of the methods of FIGS. 4-6 and/or any of the functionality discussed in FIGS. 1-3.

In various embodiments, the I/O devices 712 include an interface capable of presenting information and receiving input. For example, I/O devices 712 can present information to a listener interacting with MTSS manager 700 and receive input from the listener.

The MTSS manager 700 is connected to the network 750 via the network interface 715. Network 750 can comprise a physical, wireless, cellular, or different network.

In some embodiments, the MTSS manager 700 can be a multi-user mainframe computer system, a single-user system, or a server computer or similar device that has little or no direct user interface but receives requests from other computer systems (clients). Further, in some embodiments, the MTSS manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary MTSS manager 700. In some embodiments, however, individual components can have greater or lesser complexity than as represented in FIG. 7, components other than or in addition to those shown in FIG. 7 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for a multi-tier storage system, comprising:
identifying a candidate extent stored in a first tier of a first storage pool of a multi-tier storage system (MTSS), wherein the candidate extent is blocked from promotion because of a space constraint on a second tier of the first storage pool;
identifying a second tier of a second storage pool of the MTSS, wherein the second tier of the second storage pool provides faster input-output (I/O) access than the first tier of the first storage pool provides, wherein the second storage pool comprises available space to store the candidate extent;
copying the candidate extent to the second tier of the second storage pool; and
generating a cross-pool mapping from a first address of the candidate extent in the first tier of the first storage pool to a second address of the copied candidate extent in the second tier of the second storage pool.

2. The method of claim 1, further comprising generating a grain map of the copied candidate extent, wherein the grain map comprises a table indicating whether a plurality of grains in the copied candidate extent are valid for READ operations.

3. The method of claim 2, further comprising:
receiving a WRITE operation request for the candidate extent;
performing the WRITE operation for the candidate extent in the first tier of the first storage pool; and
updating the grain map to invalidate a grain of the candidate extent updated by the WRITE operation.

4. The method of claim 1, comprising:
receiving a WRITE operation request for the candidate extent;
performing the WRITE operation for the candidate extent in the first tier of the first storage pool; and
performing the WRITE operation for the candidate extent in the second tier of the second storage pool.

5. The method of claim 1, comprising:
receiving a READ operation request for the candidate extent;
determining that the candidate extent is copied to the second tier of the second storage pool; and
performing the READ operation for the candidate extent in the second tier of the second storage pool.

6. The method of claim 1, further comprising:
identifying the copied candidate extent during a promotion cycle; and
modifying a heat value of the candidate extent by dividing a READ access count of the candidate extent by a redundancy factor.

7. The method of claim 1, further comprising:
identifying the copied candidate extent during a promotion cycle; and
modifying a heat value of the candidate extent by dividing a WRITE access count of the heat value of the candidate extent by two.

8. The method of claim 1, further comprising generating a heat map for the MTSS by:
monitoring a number of READ operations performed for the candidate extent; and
monitoring a number of WRITE operations performed for the candidate extent.

9. The method of claim 8, wherein identifying the candidate extent comprises determining that the candidate extent is a READ_ONLY extent, wherein the number of READ operations for the candidate extent is greater than zero and the number of WRITE operations for the candidate extent equals zero.

10. The method of claim 8, wherein identifying the candidate extent comprises determining that the candidate extent is a READ_INTENSIVE extent, wherein the number of READ operations is greater than a specified threshold percentage of a sum of the number of READ operations and the number of WRITE operations.

11. A computer program product comprising program instructions stored on a computer readable storage medium, wherein the computer readable storage medium is not a transitory signal per se, the program instructions executable by a processor to cause the processor to perform a method comprising:
identifying a candidate extent stored in a first tier of a first storage pool of a multi-tier storage system (MTSS), wherein the candidate extent is blocked from promotion because of a space constraint on a second tier of the first storage pool;
identifying a second tier of a second storage pool of the MTSS, wherein the second tier of the second storage pool provides faster input-output (I/O) access than the first tier of the first storage pool provides, wherein the second storage pool comprises available space to store the candidate extent;
copying the candidate extent to the second tier of the second storage pool;
generating a cross-pool mapping from a first address of the candidate extent in the first tier of the first storage pool to a second address of the copied candidate extent in the second tier of the second storage pool; and
generating a grain map of the copied candidate extent, wherein the grain map comprises a table indicating whether a plurality of grains in the copied candidate extent are valid for READ operations.

12. The computer program product of claim 11, the method further comprising:
receiving a WRITE operation request for the candidate extent;
performing the WRITE operation for the candidate extent in the first tier of the first storage pool; and
updating the grain map to invalidate a grain of the candidate extent updated by the WRITE operation.

13. The computer program product of claim 11, the method further comprising:
receiving a WRITE operation request for the candidate extent;
performing the WRITE operation for the candidate extent in the first tier of the first storage pool; and
performing the WRITE operation for the candidate extent in the second tier of the second storage pool.

14. The computer program product of claim 11, the method further comprising:
receiving a READ operation request for the candidate extent;
determining that the candidate extent is copied to the second tier of the second storage pool; and
performing the READ operation for the candidate extent in the second tier of the second storage pool.

15. The computer program product of claim 11, the method further comprising:
 identifying the copied candidate extent during a promotion cycle; and
 modifying a heat value of the candidate extent by dividing a READ access count of the candidate extent by a redundancy factor equal to two.

16. The computer program product of claim 11, the method further comprising:
 identifying the copied candidate extent during a promotion cycle; and
 modifying a heat value of the candidate extent by dividing a WRITE access count of the heat value of the candidate extent by two.

17. The computer program product of claim 11, the method further comprising generating a heat map for the MTSS by:
 monitoring a number of READ operations performed for the candidate extent; and
 monitoring a number of WRITE operations performed for the candidate extent.

18. The computer program product of claim 17, wherein identifying the candidate extent comprises determining that the candidate extent is a READ_ONLY extent, wherein the number of READ operations for the candidate extent is greater than zero and the number of WRITE operations for the candidate extent equals zero.

19. The computer program product of claim 17, wherein identifying the candidate extent comprises determining that the candidate extent is a READ_INTENSIVE extent, wherein the number of READ operations is greater than a specified threshold percentage of a sum of the number of READ operations and the number of WRITE operations.

20. A system comprising:
 a computer processing circuit; and
 a computer-readable storage medium storing instructions, which, when executed by the computer processing circuit, are configured to cause the computer processing circuit to perform a method comprising:
identifying a candidate extent stored in a first tier of a first storage pool of a multi-tier storage system (MTSS), wherein the candidate extent is blocked from promotion because of a space constraint on a second tier of the first storage pool;
identifying a second tier of a second storage pool of the MTSS, wherein the second tier of the second storage pool provides faster input-output (I/O) access than the first tier of the first storage pool provides, wherein the second storage pool comprises available space to store the candidate extent;
copying the candidate extent to the second tier of the second storage pool;
generating a cross-pool mapping from a first address of the candidate extent in the first tier of the first storage pool to a second address of the copied candidate extent in the second tier of the second storage pool;
generating a grain map of the copied candidate extent, wherein the grain map comprises a table indicating whether a plurality of grains in the copied candidate extent are valid for READ operations;
receiving a WRITE operation request for the candidate extent;
performing the WRITE operation for the candidate extent in the first tier of the first storage pool; and
updating the grain map to invalidate a grain of the candidate extent updated by the WRITE operation.

* * * * *